US011734093B2

(12) United States Patent
Elyasi et al.

(10) Patent No.: US 11,734,093 B2
(45) Date of Patent: Aug. 22, 2023

(54) STORAGE DEVICE BLOCK-LEVEL FAILURE PREDICTION-BASED DATA PLACEMENT

(71) Applicant: SAMSUNG ELECTRONICS CO., LTD., Suwon-si (KR)

(72) Inventors: Nima Elyasi, San Jose, CA (US); Changho Choi, San Jose, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 97 days.

(21) Appl. No.: 17/009,684

(22) Filed: Sep. 1, 2020

(65) Prior Publication Data

US 2021/0397496 A1 Dec. 23, 2021

Related U.S. Application Data

(60) Provisional application No. 63/042,987, filed on Jun. 23, 2020.

(51) Int. Cl.
*G06F 11/00* (2006.01)
*G06F 3/06* (2006.01)

(52) U.S. Cl.
CPC ............ *G06F 11/008* (2013.01); *G06F 3/064* (2013.01); *G06F 3/0619* (2013.01); *G06F 3/0659* (2013.01); *G06F 3/0679* (2013.01)

(58) Field of Classification Search
CPC ...... G06F 11/008; G06F 3/0619; G06F 3/064; G06F 3/0659; G06F 3/0679; G06F 12/0246; G06F 11/1048; G06F 11/1068; G06F 3/0616; G06F 3/0614; G06N 20/00; G06N 7/005
See application file for complete search history.

(56) References Cited

U.S. PATENT DOCUMENTS

| 9,652,326 | B1 * | 5/2017 | Bauer ................. G06F 11/2035 |
| 10,282,136 | B1 * | 5/2019 | Ito ......................... G06F 3/0683 |
| 10,528,265 | B1 * | 1/2020 | Malina .................... G06F 3/067 |
| 10,795,586 | B2 * | 10/2020 | Li ....................... G06F 12/0815 |

(Continued)

OTHER PUBLICATIONS

Chen, et al.; Energy and Memory Efficient Mapping of Bitonic Sorting on FPGA; Ming Hsieh Department of Electrical Engineering, University of Southern California; Ganges.usc.edu/wiki/TAPAS; pp. 1-37.

(Continued)

*Primary Examiner* — Matthew M Kim
*Assistant Examiner* — Matthew N Putaraksa
(74) *Attorney, Agent, or Firm* — Lewis Roca Rothgerber Christie LLP

(57) ABSTRACT

In a method for data placement in a storage device including one or more blocks and a controller, the method including: receiving, by the controller of the storage device, a request to write data; determining, by the controller, a data status of the data; calculating, by the controller, one or more vulnerability factors of the one or more blocks; determining, by the controller, one or more block statuses of the one or more blocks based on the one or more vulnerability factors; selecting, by the controller, a target block from the one or more blocks based on the data status and the one or more block statuses; and writing, by the controller, the data to the target block.

21 Claims, 8 Drawing Sheets

(56) References Cited

U.S. PATENT DOCUMENTS

| | | | |
|---|---|---|---|
| 11,029,889 B1* | 6/2021 | Sharon | G11C 16/08 |
| 11,281,522 B2* | 3/2022 | Rathinasabapathy | G06F 11/0754 |
| 11,354,234 B1* | 6/2022 | Kuzmin | G06F 12/0246 |
| 2007/0260811 A1 | 11/2007 | Merry, Jr. et al. | |
| 2008/0239851 A1 | 10/2008 | Lin | |
| 2010/0274983 A1* | 10/2010 | Murphy | G06F 11/1456 711/170 |
| 2013/0007358 A1 | 1/2013 | Hu et al. | |
| 2014/0040681 A1 | 2/2014 | Wolfman et al. | |
| 2014/0136782 A1* | 5/2014 | Thomas | G06F 16/16 711/E12.016 |
| 2014/0149827 A1* | 5/2014 | Kim | G11C 29/52 714/766 |
| 2014/0258658 A1 | 9/2014 | Best et al. | |
| 2015/0113203 A1 | 4/2015 | Dancho et al. | |
| 2015/0186055 A1 | 7/2015 | Darragh | |
| 2016/0042141 A1 | 2/2016 | Deleris et al. | |
| 2016/0141029 A1* | 5/2016 | Navon | G11C 13/0069 365/148 |
| 2017/0068467 A1 | 3/2017 | Rothberg | |
| 2017/0277441 A1 | 9/2017 | Gupta et al. | |
| 2018/0181492 A1 | 6/2018 | Gupta et al. | |
| 2018/0181758 A1 | 6/2018 | Branco | |
| 2018/0232144 A1 | 8/2018 | Pahwa et al. | |
| 2018/0332012 A1 | 11/2018 | Koster et al. | |
| 2019/0034251 A1 | 1/2019 | Sridharan et al. | |
| 2019/0250980 A1 | 8/2019 | Frolikov | |
| 2019/0289029 A1 | 9/2019 | Chawla et al. | |
| 2019/0354629 A1* | 11/2019 | Zavesky | G06N 3/08 |
| 2020/0050769 A1 | 2/2020 | Bhosale et al. | |
| 2020/0097215 A1* | 3/2020 | Bazarsky | G06F 3/0649 |
| 2020/0310909 A1* | 10/2020 | Lee | G11C 11/409 |
| 2020/0409559 A1* | 12/2020 | Sharon | G06F 3/0616 |
| 2021/0223962 A1* | 7/2021 | Esaka | G06F 3/061 |
| 2021/0263664 A1* | 8/2021 | Glimcher | G06F 3/0634 |
| 2021/0266362 A1* | 8/2021 | Lintz | G06F 3/0689 |
| 2021/0286526 A1* | 9/2021 | Gao | G06F 3/0622 |
| 2021/0397496 A1* | 12/2021 | Elyasi | G06F 3/0679 |

OTHER PUBLICATIONS

Jun, et al.; Terabyte Sort on FPGA-Accelerated Flash Storage, 2017 IEEE Computer Society 25th Annual International Symposium on Field-Programmable Custom Computing Machines; pp. 17-24.

Mueller, et al.; Sorting Networks on FPGAs, Systems Group, Department of Computer Science; http://www.systems.ethz.ch/; pp. 1-25.

Muslim, et al.; Efficient FPGA Implementation of OpenCL High-Performance Computing Applications via High-level Synthesis; IEEE Access; vol. 5, 2017; pp. 2747-2762.

Srivastava, et. al. and Chen et.al.; A Hybrid Design for High Performance Large-scale Sorting on FPGA; Department of Computer Science, University of Southern California and Ming Hsieh Department of Electrical Engineering, University of Southern California, respectively; 2015 IEEE, pp. 1-6.

* cited by examiner

STORAGE DEVICE BLOCK-LEVEL FAILURE PREDICTION-BASED DATA PLACEMENT

CROSS-REFERENCE TO RELATED APPLICATION(S)

This utility patent application claims priority to and the benefit of U.S. Provisional Application Ser. No. 63/042,987, filed on Jun. 23, 2020, entitled SSD BLOCK-LEVEL FAILURE PREDICTION-BASED DATA PLACEMENT, the entire content of which is incorporated herein by reference. This application is further related to U.S. patent application Ser. No. 16/701,133 filed Dec. 2, 2019, and entitled "FIRMWARE-BASED SSD BLOCK FAILURE PREDICTION AND AVOIDANCE SCHEME", the entire content of which is incorporated herein by reference.

FIELD

One or more aspects of embodiments according to the present disclosure relate to systems and methods for storage device block-level failure prediction-based data placement.

BACKGROUND

Computer memory systems may include a large number of storage devices such as solid state drives (SSD). Each SSD within the memory system may contain a number of flash chips, where each flash chip contains a number of blocks, and each block contains a number of pages. A page can be several kilobytes and is the smallest unit for reading and writing data to the SSD.

The above information disclosed in this Background section is only for enhancement of understanding of the background of the present disclosure, and therefore, it may contain information that does not form prior art.

SUMMARY

Aspects of embodiments of the present disclosure are directed toward systems and methods for storage device block-level failure prediction.

According to some example embodiments of the present disclosure, in a method for data placement in a storage device including one or more blocks and a controller, the method including: receiving, by the controller of the storage device, a request to write data; determining, by the controller, a data status of the data; calculating, by the controller, one or more vulnerability factors of the one or more blocks; determining, by the controller, one or more block statuses of the one or more blocks based on the one or more vulnerability factors; selecting, by the controller, a target block from the one or more blocks based on the data status and the one or more block statuses; and writing, by the controller, the data to the target block.

According to some example embodiments, the data status is based on at least one of: update frequency of the data, security sensitive of the data, or latency sensitivity of the data.

According to some example embodiments, the data status is based on an indicator on the request to write data.

According to some example embodiments, the one or more block statuses include at least one of a normal block status, a vulnerable block status, or a retired block status.

According to some example embodiments, determining the data status further includes: determining, by the controller, a stream ID of the data; comparing, by the controller, the stream ID of the data to a threshold; and assigning, by the controller, the data status based on the comparison of the stream ID to the threshold.

According to some example embodiments, the one or more vulnerability factors are calculated using a first set parameters generated from block level metadata and a second set of parameters generated from drive level metadata.

According to some example embodiments, the block level metadata includes at least one of a read error, a write error, or an erase error.

According to some example embodiments, the drive level metadata includes one or more of a page identification, a block identification, a timestamp, a block-based error, and a drive log data.

According to some example embodiments of the present disclosure, in a storage device system including a controller and one or more blocks, wherein the controller is configured to: receive a request to write data; determine a data status of the data; calculate one or more vulnerability factors of the one or more blocks; determine one or more block statuses of the one or more blocks based on the one or more vulnerability factors; select a target block from the one or more blocks based on the data status and the one or more block statuses; and write the data to the target block.

According to some example embodiments, the data status is based on at least one of: update frequency of the data, security sensitive of the data, or latency sensitivity of the data.

According to some example embodiments, the data status is based on an indicator on the request to write data.

According to some example embodiments, the one or more block statuses include at least one of a healthy status, a vulnerable status, or a retired status.

According to some example embodiments, determine the data status further includes: determine, by the controller, a stream ID of the data; compare, by the controller, the stream ID of the data to a threshold; and assign, by the controller, the data status based on the comparison of the stream ID to the threshold.

According to some example embodiments, the one or more vulnerability factors are calculated using a first set parameters generated from block level metadata and a second set of parameters generated from drive level metadata.

According to some example embodiments, the block level metadata includes at least one of a read error, a write error, or an erase error.

According to some example embodiments, the drive level metadata includes one or more of a page identification, a block identification, a timestamp, a block-based error, and a drive log data.

According to some example embodiments of the present disclosure, in a method for data placement in a memory system including one or more memory devices, the method including: receiving, by a controller, a request to write data; determining, by the controller, a data status of the data; calculating, by the controller, one or more vulnerability factors of the one or more memory devices; selecting, by the controller, a target memory device from the one or more memory devices based on the data status and the one or more vulnerability factors of the one or more memory devices; and writing, by the controller, the data to the target memory device.

According to some example embodiments, the data status is based on an indicator on the request to write data.

According to some example embodiments, determining the data status further includes: determining, by the controller, a stream ID of the data; comparing, by the controller, the stream ID of the data to a predetermined threshold; and assigning, by the controller, the data status based on the comparison of the stream ID to the predetermined threshold.

According to some example embodiments, the one or more memory devices include one or more flash chips.

According to some example embodiments, the one or more memory devices include one or more solid state drives (SSDs).

DETAILED DESCRIPTION

Figure 1:
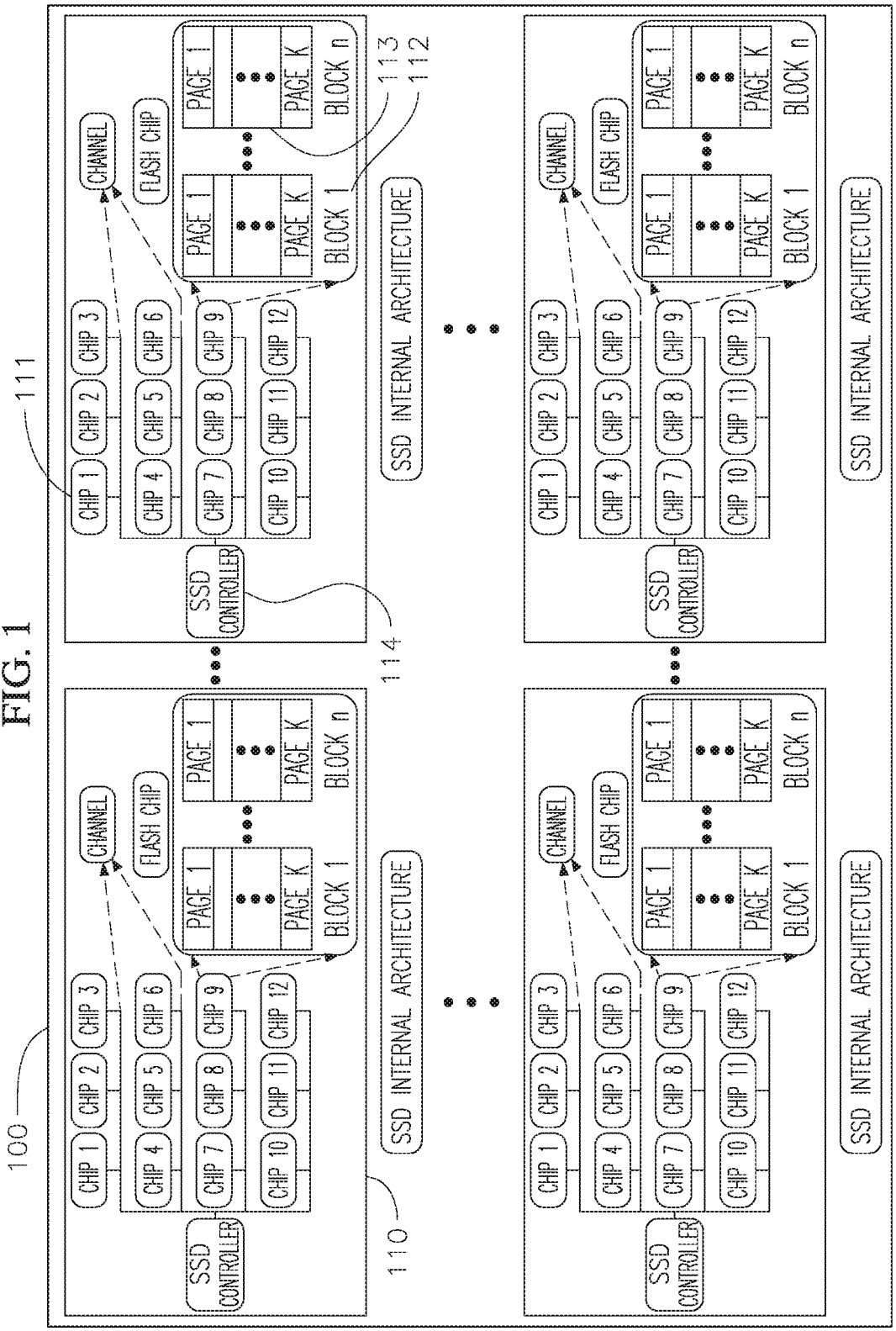
FIG. 1 shows a schematic diagram of a memory system with multiple storage devices, in accordance with example embodiments of the disclosure.

Over time, pages within blocks in a solid state drive (SSD) can degrade and become prone to failure. SSD failures in the field can lead to a server shutdown and hence impair the performance and availability of the datacenter-scale applications. Further, data stored on failed blocks may cause the data to be read from a replica block, which can potentially delay the service of a read request (e.g., thereby increasing latency, reducing throughput, and potentially missing latency service level agreements (SLAs)). To reduce and/or prevent such unexpected failures, systems which employ SSDs may use threshold-based models to avoid failures by replacing the drives prior to their failures. Such protection mechanisms may lead to high numbers of false alerts, or may not be able to predict/avoid all the SSD failures. Further, in case of identifying a physical error, the SSD may not be able to recover from that and hence avoid further device failure. Additionally, the frequent errors in the SSD may be caused by a few faulty pages within the SSD.

According to some example embodiments, a memory system may utilize the outcome of a failure prediction module at the block level and a data tiered scheme to place data within a solid state drive (SSD) or across multiple SSDs in the memory system. This approach may extend the lifetime of an SSD, better utilize the available capacity, and limit delays from reading data from replica blocks.

Some aspects of embodiments of the present disclosure relate to a mechanism for placing data within an SSD. In some embodiments, the mechanism can include categorizing data according to its importance (e.g., level of usage in a predetermined time window, tagged according to a label, actively used by an application, having a particular latency SLA requirement, update frequency of the data, security sensitivity of the data, latency sensitivity of the data, etc.). In some embodiments, the data can be categorized as hot data, moderate data, or cold data. According to this embodiment, hot data may include the most important data, moderate data may include the next most important data, and cold data may include the least important data. Based on the category of the data (e.g., status of the data), the data can be stored on blocks within the SSD according to a vulnerability factor of the blocks. The vulnerability factor can represent the probability that a block may fail, which can be calculated using a failure prediction module. By way of example, a block with a lower vulnerability factor may be less likely to fail while a block with a higher vulnerability factor is more likely to fail. In some embodiments, data categorized as more important data can be stored on blocks with lower vulnerability factors, while data categorized as less important data can be stored on blocks with higher vulnerability factors.

According to various embodiments, this disclosure may include a mechanism for placing data across flash chips within a SSD and across SSDs within a memory system. In some embodiments, a flash chip has a vulnerability factor that is defined as the sum of the vulnerability factors of each block within the flash chip. The data can be distributed to the flash chips according to the status of the data and the vulnerability factors of the flash chips. In some embodiments, data categorized as more important data can be stored on chips with lower vulnerability factors, while data categorized as less important data can be stored on chips with higher vulnerability factors. In some embodiments, the importance of the data can be categorized according to a score of the data that can exceed a predetermined threshold. The score of the data may be based on a number of factors, including, but not limited to, the level of usage in a predetermined time window, a tag according to a label, being actively used by an application, having a particular latency SLA requirement, update frequency of the data, security sensitivity of the data, or latency sensitivity of the data. In one embodiment, the score can be computed as a weighted sum S of n factors $x_i$, where each factor is weighted by a corresponding weight $w_i$: $S=\Sigma_i w_i x_x$. In another embodiment, the different factors could be combined in different ways, such as a product, or such as by using a trained neural network. In another embodiment, the importance score can be used to categorize the data:

$$\text{category}(S) = \begin{cases} \text{hot if } S > Thresh_{hot} \\ \text{moderate if } Thresh_{hot} \geq S > Thresh_{cold} \\ \text{cold if } S < Thresh_{cold} \end{cases}$$

Similarly, a SSD can have a vulnerability factor that is defined as the sum of the vulnerability factors of each flash chip within the SSD. The data can be distributed to the SSDs according to the status of the data and the vulnerability factors of the SSDs. In some embodiments, data categorized as more important data can be stored on SSDs with lower vulnerability factors, while data categorized as less important data can be stored on SSDs with higher vulnerability factors.

FIG. 1 shows an image of a memory system with multiple storage devices, in accordance with example embodiments of the disclosure.

According to FIG. 1, the memory system 100 can include a number of storage devices 110. In some embodiments, the storage devices 110 may include SSDs 110. As shown in FIG. 1, the SSDs 110 can have multiple levels of storage. By way of example, each SSD 110 can include multiple flash chips 111, each flash chip 111 can contain a number of blocks 112, and each block can contain a number of pages 113. In some embodiments, the pages 113 can be several kilobytes and can be the smallest unit for reading and writing data to the SSD 110.

In some embodiments, the SSD 110 may include an embedded controller 114 (e.g., a field programmable gate array (FPGA), application specific integrated circuit (ASIC), processor, etc.). In other embodiments, the controller 114 may be external to the SSD 110. The SSD controller 114 can include the logic circuits to service read and write data requests, run wear-levelling algorithms, and run error recovery procedures. In some embodiments, the processes executed by the SSD controller 114 may be implemented using any suitable firmware (e.g., instructions stored in a memory that configures a processor to implement the processes). Further, page 113 can include Error Correction Code (ECC) metadata that the SSD controller 114 uses to recover and fix a limited number of bit errors.

According to an embodiment, the controller 114 can send a request to a block 112 within a chip 111. The request may be to read data stored in a page 113 within a block 112 (e.g., a read request) or the request may be to write new data on a page 113 within a block 112 (e.g., a write request). If a request targets a faulty page 112 within a block 112, the request may frequently fail. Further, if the number of bit errors due to hardware failure exceeds a certain number (e.g., a threshold number), the SSD controller 114 may not be able to correct the bit errors and may provide corrupted data to a host.

After a certain number of repeated failures, the system administrator may choose to replace the SSD 110 within the memory system 100, which can increase the cost of running and maintaining the memory system 100, and may also impair the performance and availability of the applications due to a consequent server shutdown. On the other hand, when writing to a page 113 (e.g., program operation), if an error occurs, the page 113 can be marked as failed and may not be used anymore. Once a threshold number of pages 113 in a block 112 are determined to be failed, the entire block 112 is retired. SSDs 110 can reserve some spare blocks 112 to replace such retired blocks 112. If the SSD 110 runs short on the number of available spare blocks (e.g., more than 90% of spare blocks used), the SSD 110 may need to be replaced.

In some embodiments, instead of the SSD 110 reaching a failed state, a fine-grained block failure prediction system and/or method could retire the faulty blocks early in time to prevent future failures. However, predicting fine-grained errors at the block level is generally not viable because the process for predicting block level errors may need relatively large amounts of history data for individual blocks within the SSD. Because an SSD can have hundreds of thousands of blocks, the process may require processing and analyzing large datasets inside the SSD. This may be problematic because SSDs have limited computation and processing capabilities. Additionally, storing the datasets can take up valuable storage space on a SSD.

In some embodiments, a block failure prediction method can be used to identify blocks 112 that are likely to fail and retire those blocks 112 to prevent future errors. To this end, the disclosed systems include a firmware-level failure prediction technique that leverages the locality in physical errors, and combines the block-level and device-level information to generate a set of parameters/predictors and feed it to the prediction module which runs a machine learning (ML) module to predict the failure. Based on the output of prediction module, the block 112 can be retired if the block 112 is identified as likely to fail in the near future.

In some embodiments, the data to be written to blocks 112 can be tiered according to its importance. The importance of the data can be based on the data's update frequency, its security sensitivity, its latency sensitivity, or by various other factors. According to this embodiment, data can be stored within an SSD according to the importance of the data (e.g., level of usage in a predetermined time window, tagged according to a label, actively used by an application, having a particular latency SLA requirement, update frequency of the data, security sensitivity of the data, latency sensitivity of the data, etc.). For example, more important data can be written to blocks that are less likely to fail and less important data can be written to blocks that are more likely to fail. In some embodiments, the data can be stored across SSDs according to the importance of the data. For example, more important data can be stored on SSDs containing fewer blocks that are likely to fail, while less important data can be stored on SSDs containing more blocks are more likely to fail.

Figure 2:
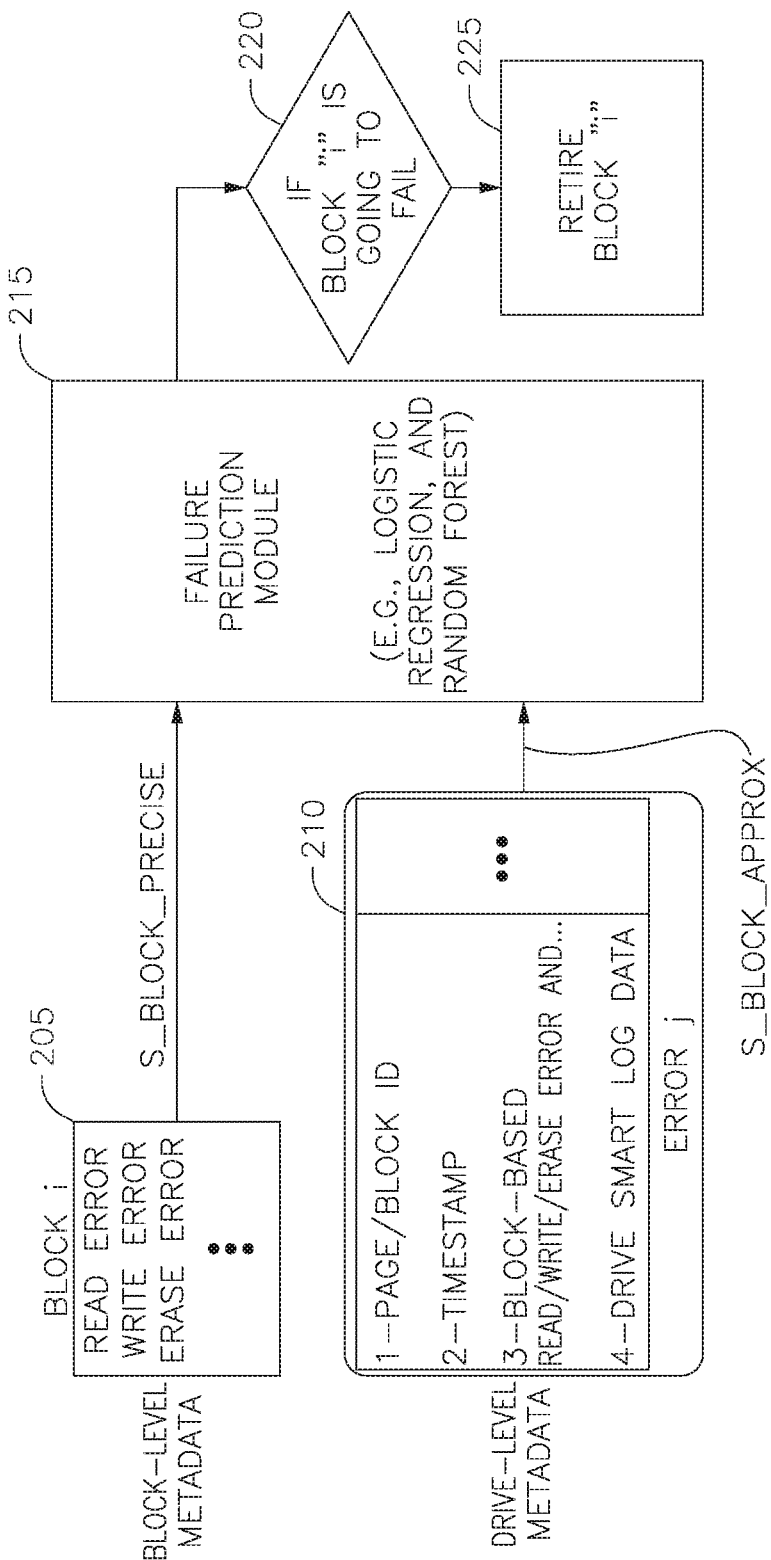
FIG. 2 shows a flowchart for a method of predicting whether a block within an SSD will fail, in accordance with example embodiments of the disclosure.

FIG. 2 shows a flowchart for a method of predicting whether a block within an SSD will fail, in accordance with example embodiments of the disclosure. According to some example embodiments, the number and order of operations illustrated in FIG. 2 may vary. For example, according to some example embodiments, there may be fewer or additional operations, unless otherwise stated or implied to the contrary. Additionally, the order of the operations may vary, unless otherwise stated or implied to the contrary. In some embodiments, the operations illustrated in FIG. 2 may be implemented using any suitable firmware.

Referring to FIG. 2, a controller (e.g., storage device controller such as the controller 114 in FIG. 1) can extract block level data from the available drive-based log data to build a set of parameters (e.g., block level parameters) for a suspected block at 205 (identified as "Block i" in FIG. 2). The suspected block may be a block that is frequently experiencing errors and is likely to fail in the future. In some examples, the extracted block level data may include a read error, write error, or an erase error. In some embodiments, the block level parameters may provide a precise measurement of the suspected block conditions because the parameters are based on data extracted directly from the suspected block. In 210, the controller may also extract SSD-level data to generate another set of parameters (e.g., drive level parameters) for the suspected block. The extracted SSD-level data can include page/block identification (e.g., ID), timestamp, block-based read/write/erase error, and drive log data. In some embodiments, the drive level parameters may provide an approximate (or aggregated) measurement of the suspected block conditions because the drive level parameters are derived from SSD level data that may be averaged across all blocks in the SSD. The controller can then transfer the block level parameters and drive level parameters generated in 205 and 210 to a failure prediction module. In 215, the failure prediction module can run a machine learning (ML) module that uses the block level parameters and drive level parameters to determine the probability that the block will fail (e.g., the vulnerability factor of the block). The ML module may use statistical models such as logistic regression and random forest to compute the vulnerability factor, but is not limited thereto (e.g., in some embodiments, the ML module uses a neural network to compute the vulnerability factor of the block). In 220, the controller determines whether the block is likely to fail by comparing the vulnerability factor calculated by the failure prediction module to a threshold (e.g., a predetermined threshold). In some embodiments, a greater vulnerability factor may correspond to a greater likelihood of failure. In other embodiments, a lower vulnerability factor may correspond to a lower likelihood of failure. In various embodiments, if the vulnerability factor satisfies a threshold (e.g., the vulnerability factor is greater than or equal to the threshold, the vulnerability factor is less than or equal to the threshold, etc.), then the block is predicted that it is likely to fail, and the block will no longer be used (e.g., SSD controller 114 retires the block or sets the status of the block to be a "retired" block) in 225. For example, if the vulnerability factor is greater than or equal to the threshold, then the block is predicted that it is likely to fail, and the block will no longer be used (e.g., SSD controller 114 retires the block or sets the status of the block to be a "retired" block). If the vulnerability factor does not satisfy the threshold (e.g., is less than the threshold), then the block is predicted that it is less likely to fail, and the block can continue to be used.

In another example where a low vulnerability factor indicates a higher likelihood of failure, if the vulnerability factor is less than or equal to the threshold, then the block is predicted that it is likely to fail, and the block will no longer be used (e.g., SSD controller 114 retires the block or sets the status of the block to be a "retired" block). In this example, if the vulnerability factor is greater than the threshold, then the block is predicted that it is less likely to fail, and the block can continue to be used.

However, retiring the vulnerable blocks based on a threshold may not be efficient. Retiring the block may prevent any further use of the vulnerable block and, in the case of a wrong prediction, retiring the block can lead to a wastage of capacity.

Instead of retiring vulnerable blocks, such blocks can still be used to store less important and less latency sensitive data to improve various metrics of the drive, such as the cost per gigabyte for SSD drives. To this end, vulnerability factors can be used to categorize blocks within an SSD (e.g., block status). For example, the statuses may include, but are not limited to, normal, vulnerable or retired (e.g., failed). A block with a vulnerability factor of zero may not be predicted as failing in the future by the failure prediction module and may be identified as a normal block (e.g., a normal block status). A block with a vulnerability factor of one has either reached the end of the program/erase (P/E) cycles lifetime, or has a certain number of pages already failed and may be identified as a retired block (e.g., a retired block status). A block with a vulnerability factor between zero and one is predicted as vulnerable by the failure prediction module and can be identified as a vulnerable block (e.g., a vulnerable block status).

In various embodiments, data can be written to blocks based on the vulnerability factors of the blocks and on the importance of the data being written. According to various embodiments, data that is determined to be more important can be stored on blocks that are less likely to fail, while data that is determined to be less important can be stored on blocks that are more likely to fail.

In some embodiments, the blocks can be classified in one of three different categories based on the vulnerability factors of the blocks. The three different categories may include, normal blocks (e.g., performance blocks), medium blocks, and vulnerable blocks (e.g., capacity blocks). The normal blocks may be blocks with vulnerability factors of 0 and can be used to store data with higher priority and value. The medium blocks can be blocks with vulnerability factors that exceed a threshold (e.g., warning threshold) but is lower than another threshold (e.g., critical threshold). The vulnerable blocks may include blocks with vulnerability factors that exceed the critical threshold, but are less than 1. The vulnerable blocks can be used to store data with less priority and value.

In various embodiments, the importance of the data can be assigned using various classification schemes. For example, the data can be assigned a level of importance based on the data's update frequency, its security sensitivity, its latency sensitivity, or by various other factors. In some embodiments, the data may be classified in one of three different categories (e.g., data statuses) based on the value of the data. The three categories may include hot data status, moderate data status, and cold data status. Hot data status may be data with higher priority, and can use high performance blocks. Moderate data status may be data with medium priority and can use medium performance. Cold data status can include data which is less frequently accessed and is less latency sensitive. The data status can be indicated by a flag or other indicator on the write request, or it can be determined within the device by, for instance, keeping track of access frequency.

Figure 3:
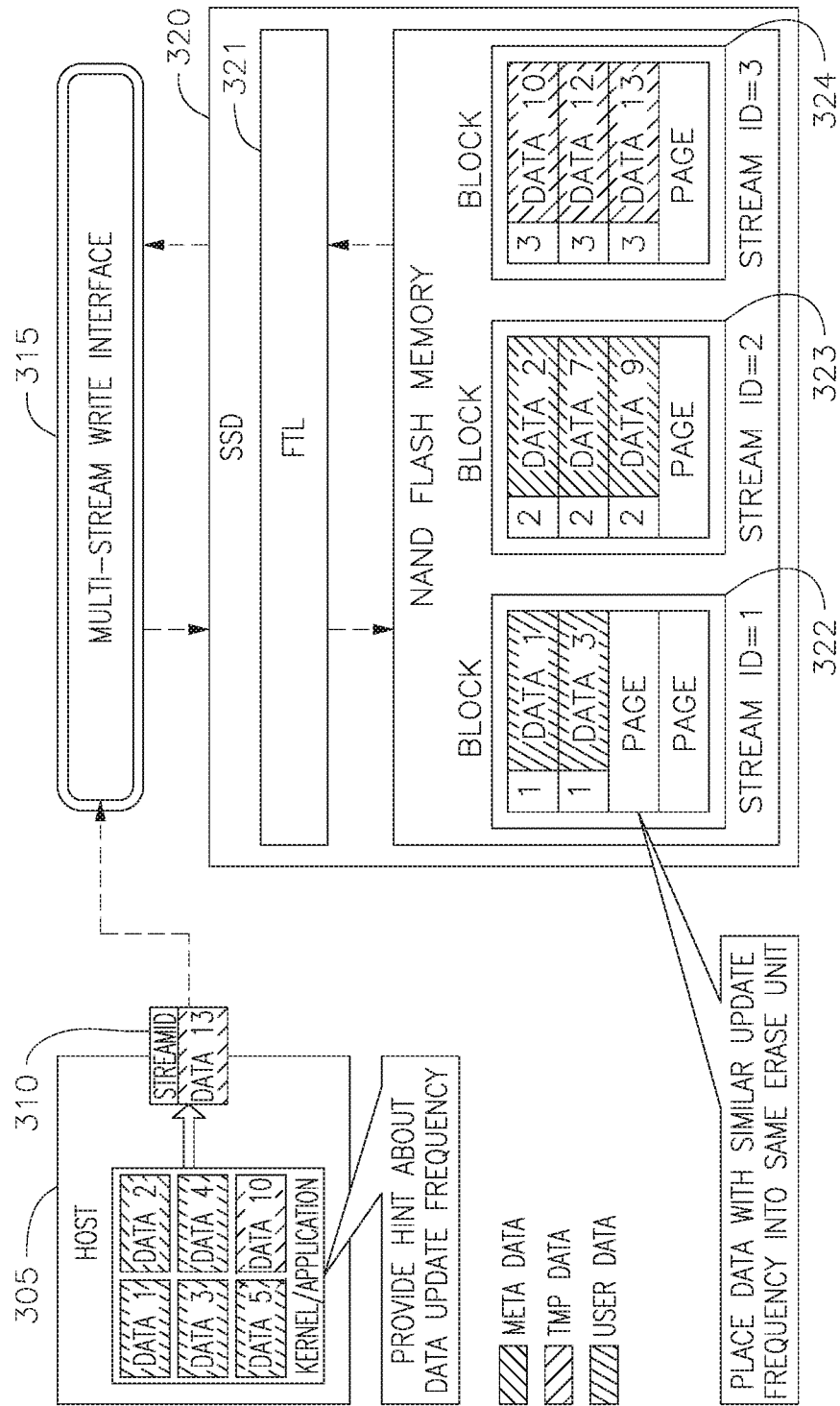
FIG. 3 shows a diagram of a multi-stream SSD, in accordance with example embodiments of the disclosure.

FIG. 3 shows a diagram of a multi-stream SSD, in accordance with example embodiments of the disclosure. In a multi-stream SSD, a host can associate each write operation with a data stream. This can allow for the data streams to be allocated to blocks based on various characteristics of the data. For example, the host can map data with different update frequencies to different data streams. In some embodiments, the multi-stream SSD can be used to categorize data according to the importance of the data.

Referring to FIG. 3, the host 305 can initiate a command to write data 310. The host 305 can assign a stream ID to data 310 based on the importance of the data 310. In some embodiments, the importance may be based on the potential update frequency of data 310. Data that is updated more frequently may be considered more important and data that is updated less frequently may be considered less important. According to this embodiment, if data 310 may be updated frequently, then it can be assigned a lower stream ID. If data 310 may be updated less frequently, then data 310 can be assigned a higher stream ID.

In some embodiments, the data statuses can be based on the stream ID falling within a threshold range. For example, if the stream ID is less than 3, then the data may be classified as hot data, and will be accessed frequently. The hot data may be stored on a normal block. If the stream ID is between 3 and 7, then the data may be classified as moderate and can be stored on a medium block. If the stream ID is 7 or greater, then the data may be classified as cold, and may be accessed infrequently. The cold data can be stored on vulnerable blocks.

Referring to FIG. 3, the data can be sent to multi-stream write interface 315. The multi-stream write interface 315 can send the data 310 to the SSD 320. The flash translation layer (FTL) 321 (e.g., a controller for translating or mapping between logical addresses and between physical addresses within the flash chips) can send the data 310 to a block for storage. In some embodiments, the FTL 321 can send the data 310 to a block according to the stream ID of the data 310. The data with lower stream ID can be stored on normal blocks and data with higher stream IDs can be stored on vulnerable blocks. For example, if the data 310 has a stream ID of 1, it can be stored on block 322. Block 322 may include only data assigned a stream ID of 1 and, thus, have a similar update frequency. If the data 310 has a stream ID of 2, it can be stored on block 323. Block 323 may only include data assigned a stream ID of 2 and, thus, have a similar update frequency. If the data 310 has a stream ID of 3, then data 310 can be stored on block 324. Block 324 may only include data assigned a stream ID of 3, and thus, have a similar update frequency.

Figure 4:
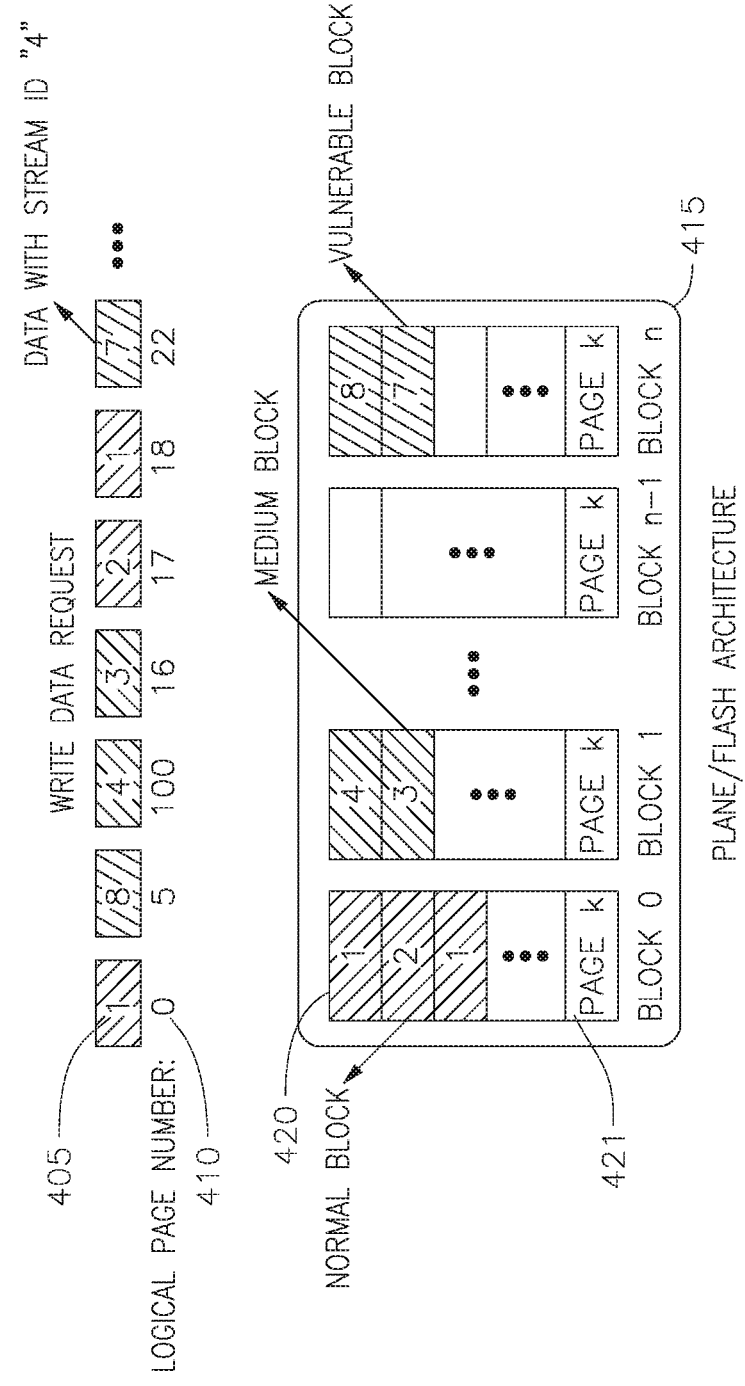
FIG. 4 shows a diagram illustrating a distribution of data according to stream ID, in accordance with example embodiments of the disclosure.

FIG. 4 shows a diagram illustrating a distribution of data according to stream ID, in accordance with example embodiments of the disclosure.

Referring to FIG. 4, a plane/flash chip architecture 415 may include a number of blocks 420. Each block 420 may include a number of pages 421. The location of each page 421 may be represented as a physical address. The physical address can be a value (e.g., a binary number) that represents a physical location within the block 420. In some embodiments, the data can be stored to the physical address according to its stream ID 405. In some embodiments, data with similar stream IDs 405 can be stored together on physical pages or at physical page addresses of a single block 420. For example, data with stream IDs 405 of 1 and 2 can be stored on the same block (e.g., a normal block). Data with stream IDs 405 of 3 and 4 can be stored on a second block (e.g., a medium block). Data with stream IDs 405 of 7 and 8 can be stored on a third block (e.g., a vulnerable block).

Figure 5:
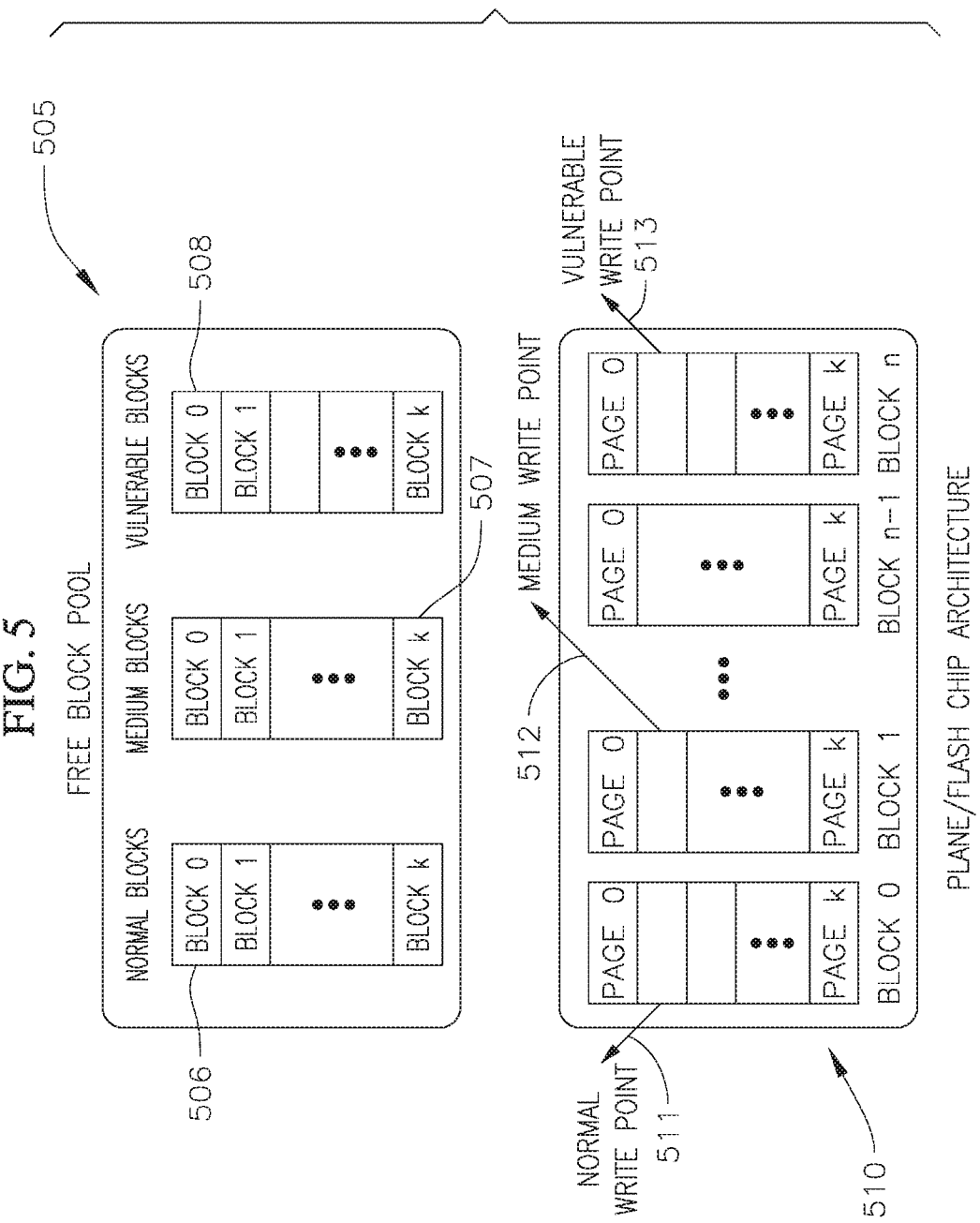
FIG. 5 shows a diagram illustrating a pooling of blocks, in accordance with example embodiments of the disclosure.

FIG. 5 shows a diagram illustrating a pooling of blocks, in accordance with example embodiments of the disclosure.

Referring to FIG. 5, an SSD can maintain a free block pool 505. In some embodiments the free block pool 505 can be separated into different categories according to the vulnerability factors of the blocks. For example, the free block pool 505 can be separated into normal blocks 506, medium blocks 507, and vulnerable blocks 508.

Further, as also shown in FIG. 5, a controller can maintain multiple write points in a plane/flash chip architecture 510. A write point can identify the next available page that can be used to store data. In some embodiments, the plane/flash chip architecture 510 can maintain three different write points. A normal write point 511 can identify the next available page in a normal block. A medium write point 512 can identify the next available page in a medium block. A vulnerable write point 513 can identify the next available page in a vulnerable block.

In addition to identifying vulnerability factors of blocks, vulnerability factors can also be determined at the flash chip level (e.g., chip vulnerability factor) and at the SSD level (e.g., SSD vulnerability factor). The vulnerability factor of a flash chip is defined as the sum of the vulnerability factors of each block in the flash chip, as demonstrated below:

$$\text{CHIP\_VUL\_FACTOR} = \Sigma_{i=1}^{N} \text{VulnerabilityFactor}_i$$

N: #of blocks in flash chip

VulnerabilityFactor$_i$: vul. Factor of block i

Data can be stored on flash chips based on the data classification and the vulnerability factors of the flash chips. In some embodiments, lower vulnerability factors may indicate a lower likelihood of flash chip failure. According to these embodiments, flash chips with higher vulnerability factors can be used to store less critical data in a tiered storage system (e.g., cold or moderate data). In other embodiments, greater vulnerability factors may indicate a lower likelihood of flash chip failure. According to these embodiments, flash chips with lower vulnerability factors can be used to store less critical data in a tiered storage system (e.g., cold or moderate data).

Similarly, the vulnerability factor of an SSD can be defined as the sum of the chip vulnerability factors of each flash chip in the SSD, as demonstrated below:

$$\text{SSD\_VUL\_FACTOR} = \Sigma_{i=1}^{K} \text{CHIP\_VUL\_FACTOR}_i$$

K: #of flash chips inside SSD

Data can be stored on SSDs based on the data classification and the vulnerability factors of the SSDs. By way of example, SSDs with higher vulnerability factors can be used to store less critical data in a tiered storage system (e.g., cold or moderate data). Moreover, such SSDs may be used as a caching layer to avoid risk of data loss.

Figure 6:
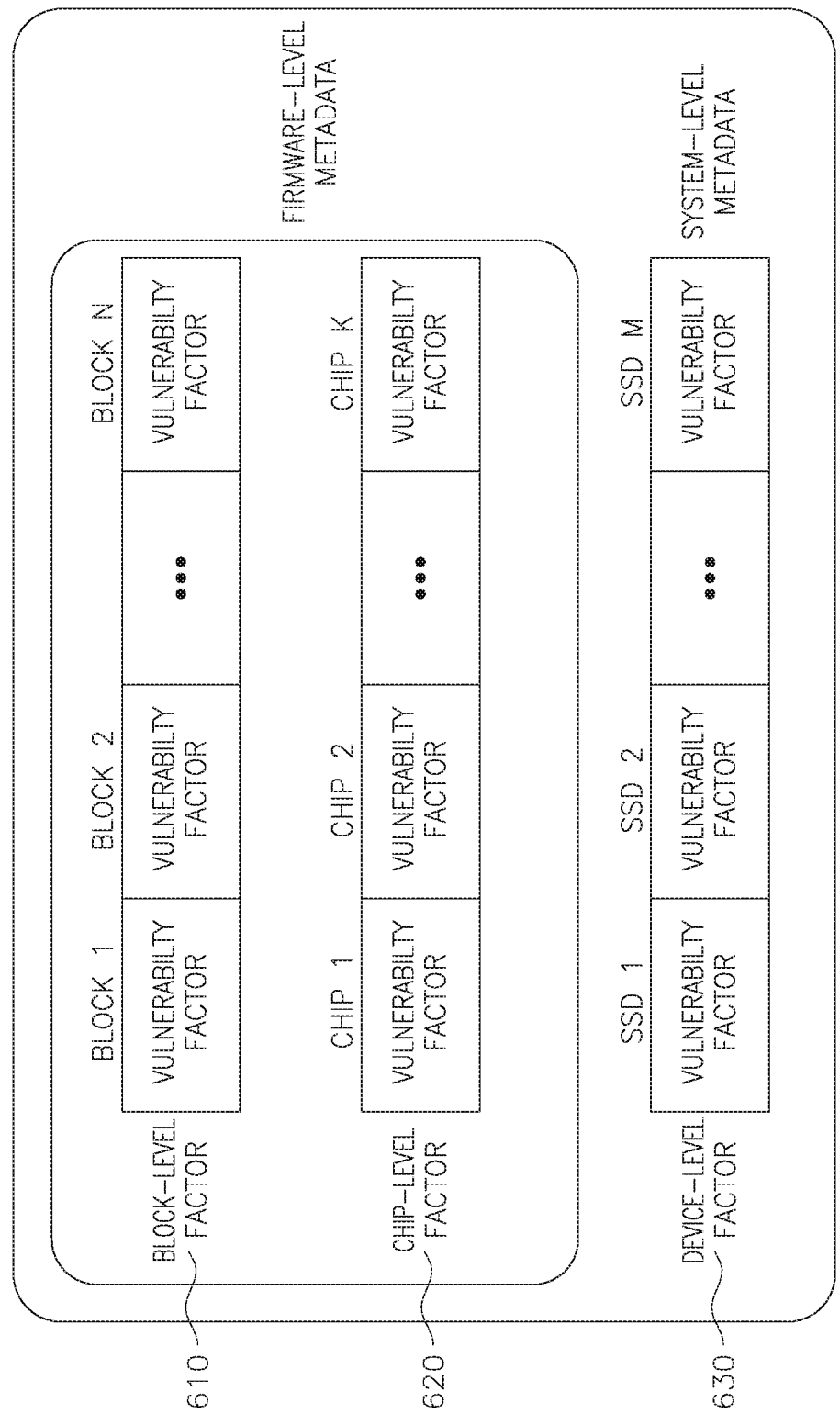
FIG. 6 is a chart showing metadata that is tracked at the block level, chip level, and device level, in accordance with example embodiments of the disclosure.

FIG. 6 is a chart showing metadata that is tracked at the block level, chip level, and device level, in accordance with example embodiments of the disclosure.

Referring to FIG. 6 the device firmware maintains the block level metadata 610 and the chip level metadata 620. In some embodiments, the block level metadata 610 and the chip level metadata 620 may provide a precise measurement of the suspected block and chip conditions because the metadata are based on data extracted directly from the suspected block and chip. The device level metadata 630 is maintained at the system level. In some embodiments, the device level metadata 630 may provide an approximate (or aggregated) measurement of the suspected block and chip conditions because the device level metadata are derived from device level data that may be averaged across all blocks or chips in the device. The block level metadata 610 may include the vulnerability factor of each individual block. The chip-level metadata 620 may include the vulnerability factor of each individual flash chip. The device-level metadata 630 may include the vulnerability factor of each individual SSD in the system.

Thus, as illustrated in FIG. 6, because block level, chip level, and device level metadata may each be maintained, embodiments of the present disclosure may be implemented at various levels of abstraction (e.g., at the block-level, at the chip level, or at the device (i.e., individual SSD) level. For example, the vulnerability factor of each flash chip can be calculated. The chip vulnerability factor can be defined as the sum of the vulnerability factors of each block within the chip. In some embodiments, workload may be directed to the flash chips according to the vulnerability factors of the chips.

In addition, vulnerability factors of each SSD may also be calculated. The SSD vulnerability factor can be defined as the sum of the vulnerability factors of each chip within the SSD. In some embodiments, workload may be directed to the SSDs according to the vulnerability factors of the SSDs.

Further, vulnerability factors of each page within a block may also be calculated. In some embodiments, workload may be directed to the pages according to the vulnerability factors of the pages.

Figure 7:
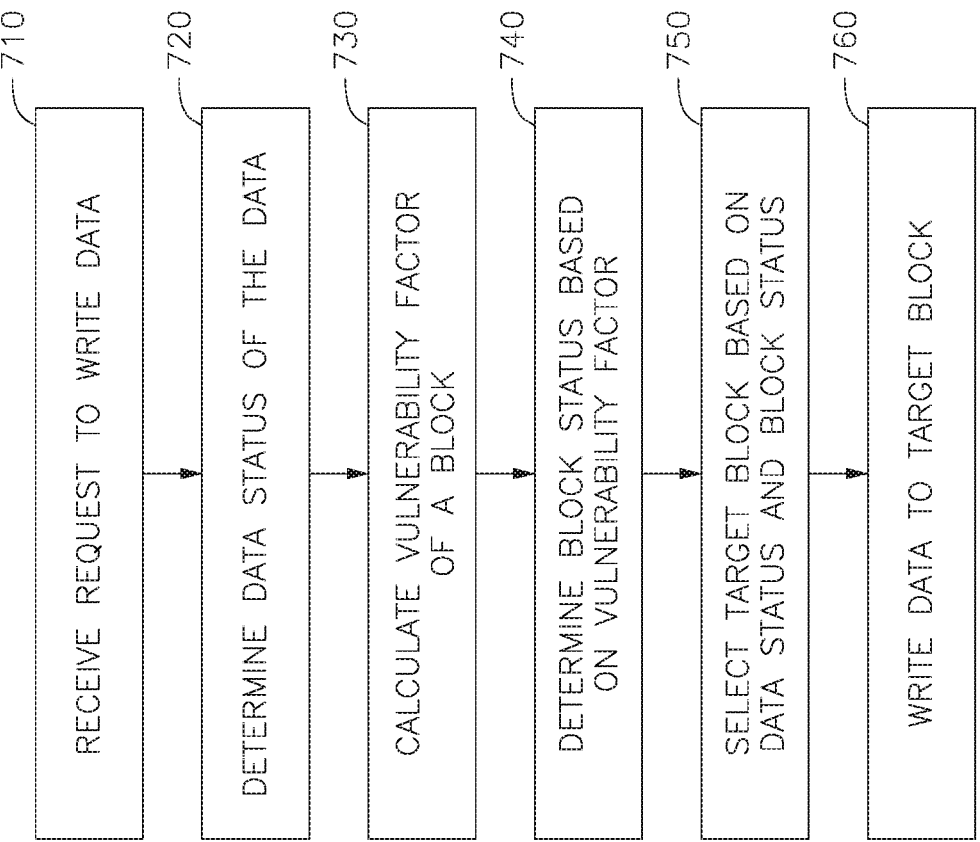
FIG. 7 is a flowchart showing a method for data placement in a SSD, in accordance with example embodiments of the disclosure.

FIG. 7 is a flowchart showing a method for data placement in a SSD, in accordance with example embodiments of the disclosure. According to some example embodiments, the number and order of operations illustrated in FIG. 7 may vary. For example, according to some example embodiments, there may be fewer or additional operations, unless otherwise stated or implied to the contrary. Additionally, the order of the operations may vary, unless otherwise stated or implied to the contrary. In some embodiments, the operations illustrated in FIG. 7 may be implemented using any suitable firmware.

Referring to FIG. 7, an SSD system can receive a request to write data to a block in 710. In some embodiments, the SSD system can include a controller (e.g., firmware) and one or more blocks. In 720, the controller of the SSD can determine the status of the data (e.g., data status) based on the importance of the data. In some embodiments, the data status can be hot data status, moderate data status, or cold data status. In some embodiments, the controller can determine the data status using multi-stream SSD. In 730, the controller can calculate the vulnerability factor of each block in the SSD. In some embodiments, the vulnerability factor of a block can be calculated using a failure prediction module. In some embodiments, the vulnerability factor may be based on the block level parameters and device level parameters. The block level parameters may include a read error, a write error, or an erase error. The SSD level parameters may include page/block identification (e.g., ID), timestamp, block-based read/write/erase error, and drive log data.

In 740, the controller can determine the block status of the blocks based on the vulnerability factors. In some embodiments, the block status may be normal block status, vulnerable block status, or retired block status. In 750, the controller can select a target block based on the data status and the block status. By way of example, the data may be determined to be important and the data status may be hot data status. Therefore, a target block with a normal block status may be selected because the data is important. After selecting the target block, the controller can write the data to the target block in 760.

Figure 8:
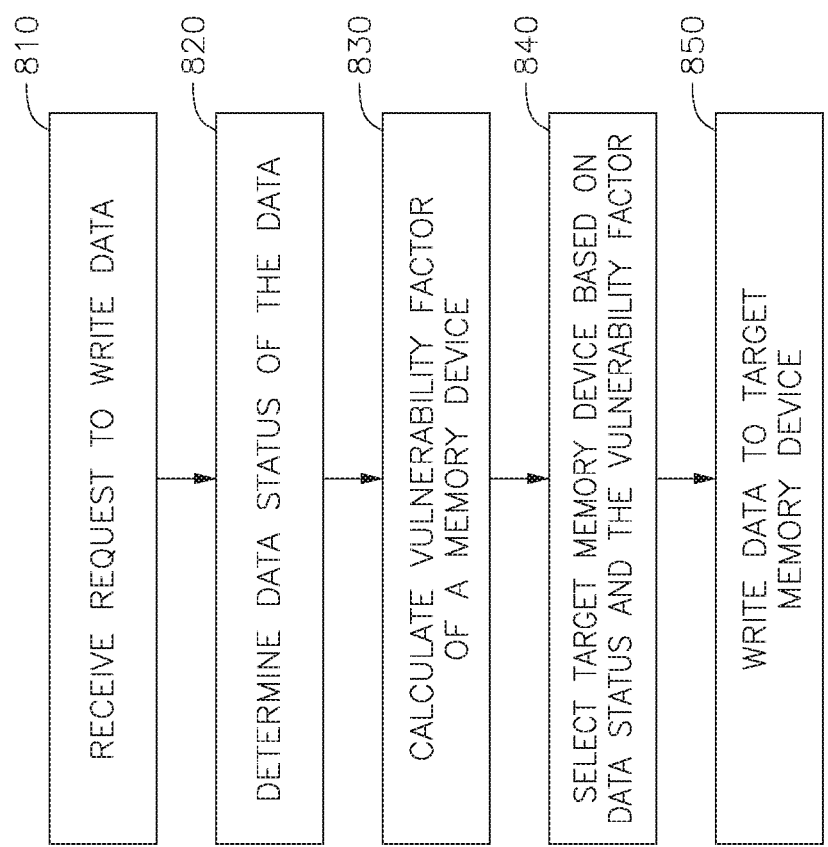
FIG. 8 is a flowchart showing a method for data placement in a memory system, in accordance with example embodiments of the disclosure

FIG. 8 is a flowchart showing a method for data placement in a memory system, in accordance with example embodiments of the disclosure. According to some example embodiments, the number and order of operations illustrated in FIG. 8 may vary. For example, according to some example embodiments, there may be fewer or additional operations, unless otherwise stated or implied to the contrary. Additionally, the order of the operations may vary, unless otherwise stated or implied to the contrary. In some embodiments, the operations illustrated in FIG. 8 may be implemented using any suitable firmware.

Referring to FIG. 8, a memory system can receive a request to write data to a memory device in 810. In various embodiments, the memory devices may include a page, a block, a flash chip, or a SSD. In some embodiments, the memory system may include a controller (e.g., firmware). In 820, controller can determine the status of the data (e.g., data status) based on the importance of the data. In some embodiments, the data status can be hot data status, moderate data status, or cold data status. In some embodiments, the data status can be determined using multi-stream SSD. In 830, the controller can calculate the vulnerability factor of each memory device in the memory system. In some embodiments, the vulnerability factor of a block can be calculated using a failure prediction module. In some embodiments, the vulnerability factor of a flash chip can be equal to the sum of the vulnerability factors of the blocks in the flash chip. In some embodiments, the vulnerability factor of a SSD can be equal to the sum of the vulnerability factors of the flash chips in the SSD. According to these embodiments, the vulnerability factors can be calculated using block-level metadata, flash chip-level metadata, and device-level metadata.

In 840, the controller can select a target memory device based on the data status and the vulnerability factor of the memory device. By way of example, the data may be determined to be important and the data status may be hot data status. Therefore, the controller can select a target memory device with a lower vulnerability factor because the data is important. After selecting the target memory device, the controller can write the to the target memory device in 850.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like.

Features of the inventive concept and methods of accomplishing the same may be understood more readily by reference to the aforementioned detailed description of embodiments and the accompanying drawings. The aforesaid embodiments were described in more detail with reference to the accompanying drawings, in which like reference numbers referred to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of embodiments of the present disclosure may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

In the previous description, for the purposes of explanation, numerous specific details were set forth to provide a thorough understanding of various embodiments. It is apparent, however, that various embodiments may be practiced without these specific details or with one or more equivalent arrangements. Further, one of ordinary skills in the art would appreciate that various features of two or more embodiments described herein may be combined in any suitable manner without departing from the spirit or scope of the present disclosure. In other instances, well-known structures and devices are shown in block diagram form in order to avoid unnecessarily obscuring various embodiments.

It is understood that when an element, layer, region, or component was referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it is understood that when an element or layer was referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicated otherwise. It is further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the disclosure refers to "one or more embodiments of the disclosure." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures.

Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A method for data placement in a storage device comprising a first block, a second block, and a controller, the method comprising:
   receiving, by the controller of the storage device, a request to write data;
   determining, by the controller, a data status of the data;
   calculating, by the controller, a first block vulnerability factor of the first block and a second block vulnerability factor of the second block, wherein the first and second block vulnerability factors represent a probability of failure of the first and second blocks;
   determining, by the controller, a first block status of the first block based on the first block vulnerability factor and a second block status of the second block based on the second block vulnerability factor;
   selecting, by the controller, a target block from the first block or the second block based on the data status and the first block status and the second block status; and
   writing, by the controller, the data to the target block.

2. The method according to claim 1, wherein the data status is based on at least one of: update frequency of the data, security sensitive of the data, or latency sensitivity of the data.

3. The method according to claim 1, wherein the data status is based on an indicator on the request to write data.

4. The method according to claim 1, wherein the first block status and the second block status comprise at least one of a normal block status, a vulnerable block status, or a retired block status.

5. The method according to claim 1, wherein determining the data status further comprises:
   determining, by the controller, a stream ID of the data;
   comparing, by the controller, the stream ID of the data to a threshold; and
   assigning, by the controller, the data status based on the comparison of the stream ID to the threshold.

6. The method according to claim 1, wherein the first block and second block vulnerability factors are calculated using a first set parameters generated from block level metadata and a second set of parameters generated from drive level metadata.

7. The method according to claim 6, wherein the block level metadata comprises at least one of a read error, a write error, or an erase error.

8. The method according to claim 6, wherein the drive level metadata comprises a page identification, a block identification, a timestamp, a block-based error, and a drive log data.

9. A storage device comprising:
   a processor;
   a first block; and
   a second block, wherein the processor is configured to:
   receive a request to write data;
   determine a data status of the data;
   calculate a first block vulnerability factor of the first block and a second block vulnerability factor of the second block, wherein the first and second block vulnerability factors represent a probability of failure of the first and second blocks;

determine a first block status of the first block based on the first block vulnerability factor and a second block status of the second block based on the second block vulnerability factor;

select a target block from the first block or the second block based on the data status and the first block status and the second block status; and write the data to the target block.

10. The storage device according to claim 9, wherein the data status is based on at least one of: update frequency of the data, security sensitive of the data, or latency sensitivity of the data.

11. The storage device according to claim 9, wherein the data status is based on an indicator on the request to write data.

12. The storage device according to claim 9, wherein the first block status and the second block status comprise at least one of a healthy status, a vulnerable status, or a retired status.

13. The storage device according to claim 9, wherein determine the data status further comprises:

determine, by the processor, a stream ID of the data;

compare, by the processor, the stream ID of the data to a threshold; and assign, by the processor, the data status based on the comparison of the stream ID to the threshold.

14. The storage device according to claim 9, wherein the first block and second block vulnerability factors are calculated using a first set parameters generated from block level metadata and a second set of parameters generated from drive level metadata.

15. The storage device according to claim 14, wherein the block level metadata comprises at least one of a read error, a write error, or an erase error.

16. The storage device according to claim 14, wherein the drive level metadata comprises one or more of a page identification, a block identification, a timestamp, a block-based error, and a drive log data.

17. A method for data placement in a memory system comprising a first memory device, a second memory device, and a controller, the method comprising:

receiving, by the controller, a request to write data;

determining, by the controller, a data status of the data;

calculating, by the controller, a first memory device vulnerability factor of the first memory device and a second memory device vulnerability factor of the second memory device, wherein the first and second memory device vulnerability factors represent a probability of failure of the first and second memory devices;

selecting, by the controller, a target memory device from the first memory device or second memory device based on the data status and the first and second memory device vulnerability factors; and writing, by the controller, the data to the target memory device.

18. The method according to claim 17, wherein the data status is based on an indicator on the request to write data.

19. The method according to claim 17, wherein determining the data status further comprises:

determining, by the controller, a stream ID of the data;

comparing, by the controller, the stream ID of the data to a predetermined threshold; and assigning, by the controller, the data status based on the comparison of the stream ID to the predetermined threshold.

20. The method according to claim 17, wherein the first memory device and the second memory device comprise a flash chip.

21. The method according to claim 17, wherein the first memory device and the second memory device comprise a solid state drive (SSD).

* * * * *